(12) United States Patent
Gary, Jr.

(10) Patent No.: US 10,853,850 B1
(45) Date of Patent: Dec. 1, 2020

(54) AUTOMATICALLY INSERTING AN IDENTIFIER INTO AN ITEM RECORD USING A WEB INTERFACE IN EMBEDDED CODE ON A WEBSITE ASSOCIATED WITH A NONPROFIT ENTITY, AND GENERATING, USING THE IDENTIFIER, AN IMPACT STATEMENT COMMUNICATING A VALUE IN CHARITABLE GOODS AND/OR CHARITABLE SERVICES

(71) Applicant: iDonate LLC, Plano, TX (US)

(72) Inventor: Raymond J. Gary, Jr., Dallas, TX (US)

(73) Assignee: iDonate LLC, Plano, TX (US)

( * ) Notice: Subject to any disclaimer, the term of this patent is extended or adjusted under 35 U.S.C. 154(b) by 0 days.

(21) Appl. No.: 16/829,829

(22) Filed: Mar. 25, 2020

Related U.S. Application Data

(63) Continuation of application No. 15/348,661, filed on Nov. 10, 2016, now abandoned, which is a continuation-in-part of application No. 14/936,285, filed on Nov. 9, 2015, now abandoned, which is a continuation-in-part of application No. 14/751,554, filed on Jun. 26, 2015, now abandoned, which is a continuation-in-part of application No. 13/874,792, filed on May 1, 2013, now abandoned.

(Continued)

(51) Int. Cl.
*G06Q 30/02* (2012.01)
*G06Q 40/04* (2012.01)

(52) U.S. Cl.
CPC ..... *G06Q 30/0279* (2013.01); *G06Q 30/0278* (2013.01); *G06Q 40/04* (2013.01)

(58) Field of Classification Search
CPC . G06Q 30/0279; G06Q 40/04; G06Q 30/0278
See application file for complete search history.

(56) References Cited

U.S. PATENT DOCUMENTS

| | | | |
|---|---|---|---|
| 2003/0078791 A1* | 4/2003 | Tufte | G06Q 30/0279 |
| | | | 705/329 |
| 2004/0181468 A1* | 9/2004 | Harmon | G06Q 30/06 |
| | | | 705/29 |

(Continued)

OTHER PUBLICATIONS

"Get Cash for your old CDs, DVDs, Games & Tech", by musicMagpie.co.uk. Internet Archive WayBack Machine (https://web.archive.org/web/20120929150451/https://www.musicmagpie.co.uk/). Sep. 29, 2012, pp. 1-2. (Year: 2012).*

(Continued)

*Primary Examiner* — William A Brandenburg
(74) *Attorney, Agent, or Firm* — Haynes and Boone, LLP

(57) ABSTRACT

A system and method of processing, within a single procedure, cash equivalents and fix assets from any disposition class. The method includes identifying the benefactor and asset to be donation. Once identified, the asset is classified into one of three disposition classes. The disposition classes are used to determine the value for valuing. Once the value is determined, an impact statement is generated. Depending on the disposition class, the item is either converted to funds directly or through an intermediary. Once the item is converted to funds, the funds are transferred to the identified benefactor.

6 Claims, 13 Drawing Sheets

Related U.S. Application Data

(60) Provisional application No. 62/017,989, filed on Jun. 27, 2014.

(56) References Cited

U.S. PATENT DOCUMENTS

2008/0005017 A1* 1/2008 Poster .................... G06Q 40/00
 705/39
2012/0078644 A1* 3/2012 McCrehan ............. G06Q 10/10
 705/1.1

OTHER PUBLICATIONS

"Editorial: The Truth About CarMax", by Mike Solowiow. The Truth About Cars. Mar. 5, 2009. (Year: 2009).*

* cited by examiner

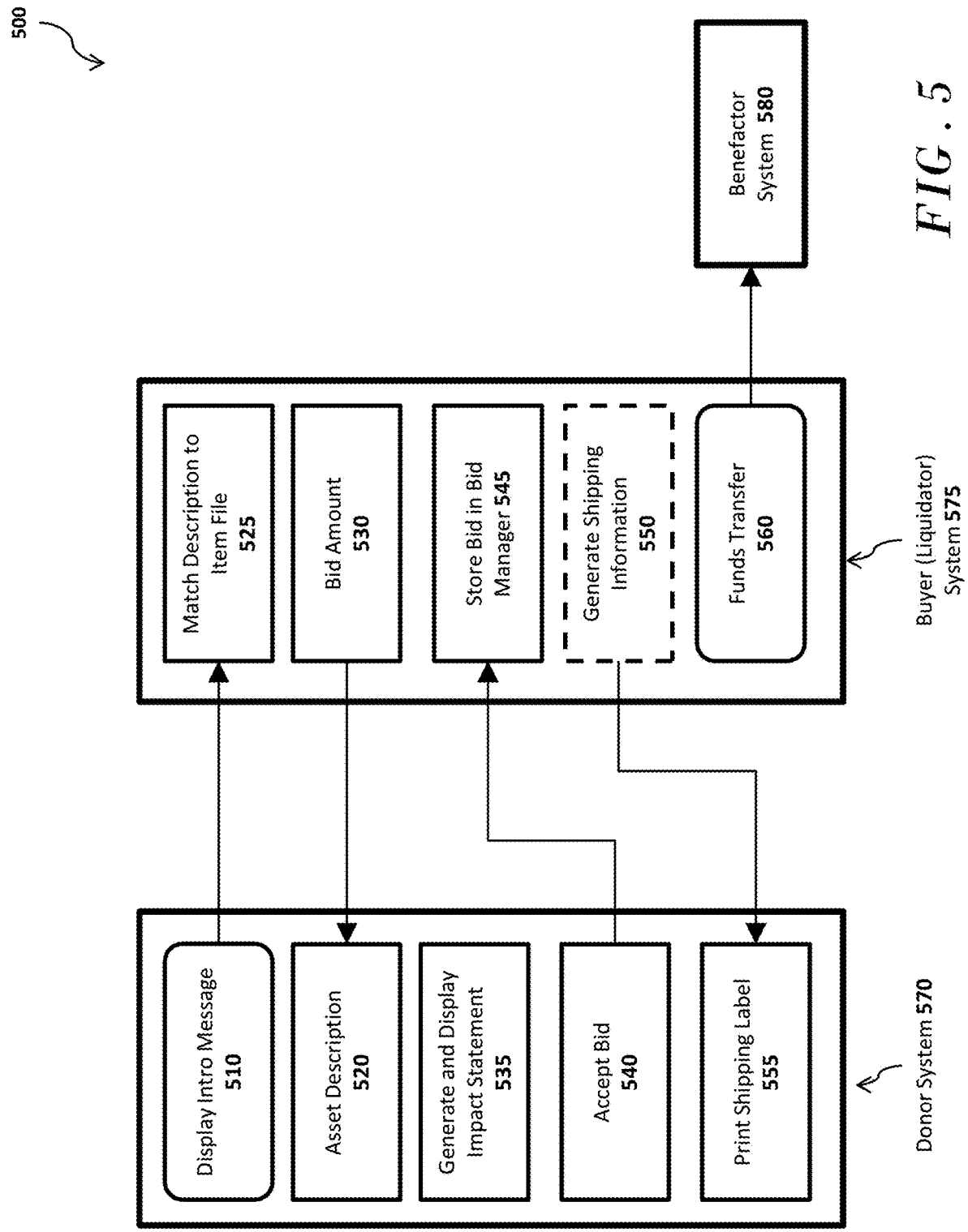

AUTOMATICALLY INSERTING AN IDENTIFIER INTO AN ITEM RECORD USING A WEB INTERFACE IN EMBEDDED CODE ON A WEBSITE ASSOCIATED WITH A NONPROFIT ENTITY, AND GENERATING, USING THE IDENTIFIER, AN IMPACT STATEMENT COMMUNICATING A VALUE IN CHARITABLE GOODS AND/OR CHARITABLE SERVICES

CROSS-REFERENCE TO RELATED APPLICATIONS

The present application is a continuation of U.S. patent application Ser. No. 15/348,661 filed on Nov. 10, 2016 and entitled "Database Management System for Tracking Real-World Asset Transfers," which is a continuation-in-part of U.S. patent application Ser. No. 14/936,285 filed on Nov. 9, 2015 and entitled "Liquidation System for Cash and Fixed-Asset Donations," which is a continuation-in-part of U.S. patent application Ser. No. 14/751,554 filed on Jun. 26, 2015 and entitled "Discerning Cash and Fixed Asset Donations," which claims priority to Provisional Application Ser. No. 62/017,989 filed on Jun. 27, 2014 and entitled "Discerning Cash and Fixed Asset Donations," the entire disclosures of which are all hereby incorporated by reference in their entirety. U.S. patent application Ser. No. 15/348,661 is also a continuation-in-part of U.S. patent application Ser. No. 13/874,792 filed on May 1, 2013 and entitled "Bid-Based Charitable Impact Statement," the entire disclosure of which is hereby incorporated by reference in its entirety.

FIELD OF INVENTION

The embodiments describe herein relate to systems and methods for processing a variety of types of donations involving real-world asset transfers within a single unified system.

BACKGROUND

Unified Class. Systems and inventions in the prior art focus on the collection and processing of a unified class of assets. For example, there is a substantial body of art related to the donation of life insurance policies to institutions. While the exact terms of the donated insurance policies will vary widely, and unpredictably, the systems are able to uniformly handle the entire asset class. They do not present or handle other types of assets such as business ownership or motorized vehicles.

Alternative cash donation option. An alternative for processing fixed assets and cash is to provide a would-be buyer the option of skipping the fixed asset purchase and instead provide a cash contribution to the charity the buyer had selected. In this system, the buyer goes to a classified or auction online site and conducts a search. The search leads the buyer to a list of items meeting the search requirements. Those search requirements may include the name of a charity the buyer has selected. If the buyer decides to purchase an item, a portion of the sale is given to the charity. The funds either originate from the buyer or the website's transaction manager. If the buyer is unable to find something to purchase, an item's description gives the buyer the option to make a cash contribution to the charity listed in their original item search. The somewhat improbable business model is to turn funds a shopper planned to use for a specific purpose into an unplanned donation.

Non-cash assets are all treated identically. These systems make little attempt to identify the asset class. The system is unable to value the item and relies on the honor system for tax reporting. The final collection of fixed assets is completed manually. While these types of systems are known in the industry, their relative lack of sophistication makes full automation impossible.

Multiple systems. Processing institutional gifting of both cash and fixed assets currently requires a combination of an ATM, retail point-of-sale system, title management software, and logistics planning systems. Integrating these systems if often limited by outside concerns, such as discussed in the next section, but the necessary complexity in a diverse asset donation system limits the scope of the practical functionality.

Multiple entities. In addition to requiring multiple systems, current entities that accept both cash and fixed assets have separate legal entities to handle the charitable funds and the non-charitable funds from sale of asset. Since not the all funds from the sale of the asset are for a charitable institution, the sale must also involve a for-profit legal entity. Cash would be distributed to one charitable entity and the funds for the sale of assets are distributed through a for-profit and then to the seller. For instance, at eBay, the entire fund from the sale of the asset is distributed back to the seller through their for-profit PayPal. The seller then later receives a notice that they need to transfer a portion of those funds to the charitable institution. This second transfer is executed through an independent nonprofit organization associated with eBay. The result is a complex set of separate systems and institutions.

The embodiments described below addresses these abating factors.

SUMMARY OF THE INVENTION

The embodiments below are directed to systems and methods to convert all donated assets to transferable funds before presentation of the donation to the charity.

Accordingly, several objects and advantages of the described embodiments are:
a) to provide donors with one site to handle any type of preferred donation;
b) to provide donors with one site to donate to multiple charities;
c) to provide donors with a list of additional suggested asset from different asset classes;
d) to provide a cash conversion donation of a physical asset;
e) to provide a cash conversion, in a single system, for any type of asset; and
f) to provide liquidators access to only items they wish to broker;
g) to provide an impact statement based on a specific item description;
h) to provide an impact statement immediately after entry of the asset description;
i) to provide accurate impact statements based on a bid on an asset;
j) to provide dynamic asset pricing of bids;
k) to provide accurate impact statements using an item description;
l) to provide the best bid from multiple liquidators to maximize the donation impact;
m) to provide a specific item description using a typed description;

n) to provide a specific item description using a series of hierarchal selections;

o) to provide a specific item description using the input of an identification code associated with a specific asset.

Further objects and advantages of this invention will become apparent from a consideration of the drawings and the ensuing description of the drawings

BRIEF DESCRIPTION OF THE DRAWINGS

The accompanying drawings, which are incorporated in and constitute a part of this specification, illustrate the embodiments and together with the corresponding description.

FIG. 5 illustrates example interactions between donor, benefactor, and integrated donation computer systems.

DETAILED DESCRIPTION

Figure 1A:
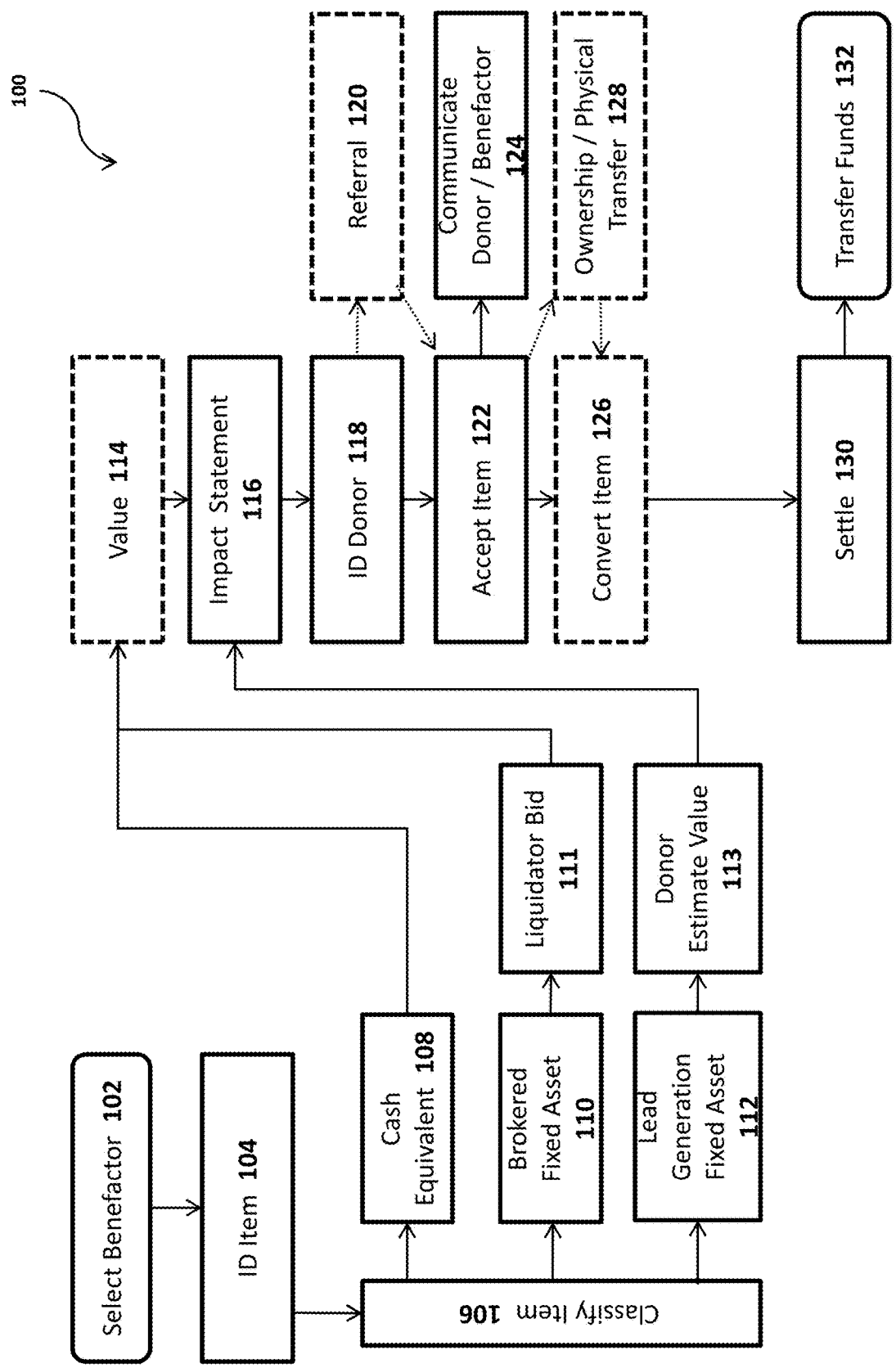
FIG. 1A illustrates a process that takes place in an integrated database system that converts cash and fixed assets into settled funds.

FIG. 1A illustrates a process 100 that takes place in an integrated database system that tracks real-world assets at these assets are converted into settled funds for donation. The process may be performed from the perspective of a donor/user that is identified to the system by a donor ID. First, in step 102, the donor selects a benefactor. The benefactor may be any type of nonprofit entity including a charity, cause, public institution, government entity, fund, individual, private entity, account, or crowdfunding campaign. The benefactor may be selected from a list of predefined benefactors or entered manually buy the donor.

Once the benefactor is selected, the donor must then identify the item they wish to donate in step 104. The item may be any type of tangible or intangible asset such as electronic items, cash equivalents, professional service, insurance, or a business ownership. The item is identified to the system via any number of user input methods such as, for example, keying an alphanumeric description, keying an item description with predictive text provided by the system, keying a search into the system and selecting from the results, scanning a barcode, selecting from a series of hierarchical drop down boxes, graphical controls, image capture, motion detection, multimodal interaction, electronic pen, touch input, speech synthesis, face input, voice entry, electroencephalography systems, or any combination of the above. The item may be identified by comparing the description against a product database of predefined products where each predefined product is associated with a product database record that includes at least a unique product identifier. Upon determining the product record that corresponds to the item description, the system may associate the item description with the unique product identifier.

In some examples, selecting a benefactor in step 102 and identifying an item in step 104 are performed by a user accessing a user interface of a donor computer system (e.g., a desktop, laptop, mobile device, and so forth). The donor system may, for example, display a web interface or other interface that provides the user with the options that may be selected. For example, the interface may be provided by a website, embedded code within a website, or application software that causes the donor computer system to perform the selection and/or identification tasks. In some examples, the system receives the selections and identifications from the donor at a backend server system. The backend server may receive the selections and identifications via a network connection. For example, the donor computer system may connect to the backend server via the network connection and utilize one or more application programming interfaces (APIs) provided by the backend server to communicate with the backend server. In some examples, the backend server is configured as a web server and/or database server that receives information from the donor computer system using the APIs.

Once the donor selects the benefactor and identifies the item to the system, the system (e.g., at a backend server) uses the identification of the item or the unique product identifier to create an item record for the item. The item record includes at least the item description and the unique product identifier. The item record may then be stored in an item tracking database so that the item can be tracked through the system as it is converted to settled funds. The item record may also include the item's disposition class which is determined in step 106. The disposition class may be based on item description stored in the corresponding product database record. The disposition class may also be derived by the system using one or more keywords from the item description. For example, the one or more keywords may be matched with stored descriptions to identify stored descriptions that are similar, and classify the item description to match the one or more similar stored descriptions. In that case, the item description may be new to the system whereby a new product record may be create in the database and a unique product identifier included in the product record. Additionally, the donor may supply a classification with the item identification that will be used as the item's classification, which the system could then verify against a corresponding item description. Disposition classes include cash equivalents 108, brokered fixed assets 110, and lead generation fixed assets 112. Examples of assets in each class are described in detail below in reference to FIG. 2. An item's disposition class determines, among other thing, the processing path that it will take through the system in order to be converted to settled funds. Each specific path is described for each class in more detail in reference to FIGS. 1B-D.

The donor system associates a plurality of tracking identifiers with the item record. For example, the backend server may associate the following tracking identifiers with the item using one or more databases: item description, campaign, designation, frequency, schedule, tracking number, organization, unique transaction identifier, status, and so forth.

The item description includes keywords that describe the item. For example, if the item is a car, the item description may include the manufacturer, make, model, model year, mileage, and so forth.

The campaign identifier allows the item record to be associated with a particular campaign. For example, an item record may be assigned to a particular campaign, such that the donation is associated with and aggregated with other item records that are assigned to that campaign.

The designation identifier may be used to specify a particular benefactor (e.g., charity) to receive the proceeds of converting the item to settled funds.

The frequency identifier may be used to specify a frequency of a donation of the item and the schedule identifier may indicate re-occurring donations of the same item or type of item. For example, an item that is a cash equivalent may specify in the item's record that the donation is to re-occur on a bi-weekly, monthly, or yearly basis according to a particular schedule. The re-occurring donations corresponding to the item may share the same schedule identifier, which associates the re-occurring donations with the same item or type of item.

The tracking number may be used by the donor/user to track the item at various steps of the conversion process. For example, a donor may input the tracking number at a website via a user device, and in response, the system (e.g., the backend server) may look up the item record in the item database and provide the status of the donation (i.e., the step in the conversion process) to the user device.

The organization identifier may be used to assign the item to a particular organization, such that the item is associated with that organization. For example, employees of the organization may donate items and assign those items to the organization such that the total amount of proceeds raised by conversion of the items to settled funds may be tracked and/or credited to the employees or organization.

The unique transaction identifier may be used by the backend server to associate the identifiers with the particular transaction for conversion of the item. For example, a donor may input a description of a particular item to donate. The process for converting the item to settled funds (i.e., the transaction) may be assigned a unique transaction identifier. The transaction identifier may be used by the system to, for example, perform lookups responsive to status requests. The transaction identifier may also be used by the system to manage the transaction by accessing the transaction identifier during the transaction to update the various identifiers included the item record.

The status identifier identifies the status of the item at different stages of the transaction. For example, the transaction identifier may default to a pending state, but later may be updated by the backend server to an approved state, a transferred state, a sold state, a completed state, and so forth, depending upon the stage of the transaction.

In some examples, identifiers are provided by donors. For example, a donor may specify the particular organization and campaign with which to associate the donation, as well as the frequency of the donation. In other examples, the identifiers are provided automatically by code/instructions stored in the system or used by the donors. For example, a charity may include a web interface in embedded code on its website with particular campaign and/or designation identifier, such that a donor using that website will automatically have the campaign and designation identifiers inserted into the item record. In some examples, identifiers are generated on the backend server. For example, the backend server may generate the unique transaction identifier, status of the transaction, and tracking number.

Regardless of item classification, one or more impact statements are generated for each item in step 116. The impact statements may be included in the item record. The impact statement is based on a benefactor provided metric that converts the value of the item into the amount of assistance the benefactor will receive from the donation. The system (e.g., at the backend server) uses the item's value derived in step 114 to calculate an impact statement. To generate an impact statement for a particular item, beneficiaries may provide the system with metrics that indicate how the item will provide tangible benefits for the beneficiary. Examples of benefactor provided metrics are as follows:

$8.32 provides one temporary shelter for the beneficiary Red Cross;

$27.32 buys one family a week of food for the beneficiary The Pantry;

$12.00 supplies one pet with food, shelter, and care for the beneficiary Humane Society;

$50.00 will produce 12 finished products for a beneficiary startup.

Based on these and other provided metrics as well as the donated item value, the system determines impact statement for the item. For example, for an item valued at a $100, the system may generate the following impact statements:

12 temporary shelters;

4 families a week of food;

8 pet with food, shelter, and care;

24 finished products for a startup.

The impact statement may be transmitted to and displayed on the user device by the backend server. The backend server may, for example, determine the beneficiary metrics to utilize based on the designation identifier (which identifies one or more benefactors) associated with the transaction. The impact statement helps the donor to understand the importance of the donation and encourages completion of the donation process. The impact statement may be provided to the donor upon determination, after the item is accepted, or after the donation process. The impact statement may be written as above, for example, or may use one or more icons or graphics to represent each portion of the statement. Impact statements are described in more detail below in reference to FIGS. 3A-3E.

Process 100 is discussed in more detail below for each disposition class in reference to FIGS. 1B-D.

The donation system may generate communications at each step in the conversion process that are transmitted to and/or displayed on the user device. For example, a backend server may automatically generate an email, text, or other communication at each step in the process to notify a donor as to the status of the donation transaction. For example, each time the status identifier is updated, an electronic communication to the donor may be triggered and provided as a notification or similar message on the user device.

Figure 1B:
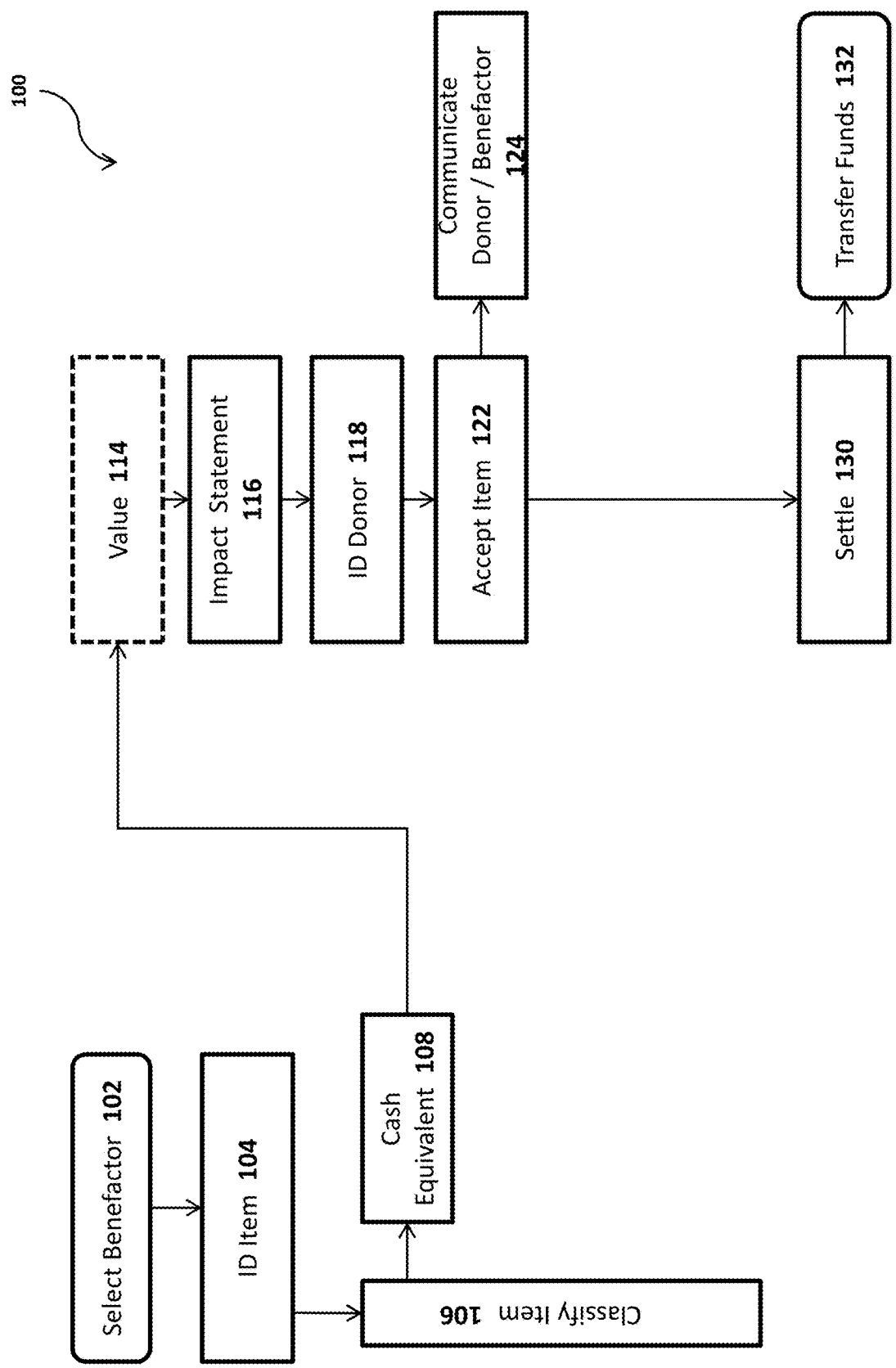
FIG. 1B illustrates the process of the integrated database system of FIG. 1A specifically highlighting the process for handling cash equivalents. For comparison, inapplicable steps for handling other asset classes have been removed.

FIG. 1B illustrates the process of the integrated database system of FIG. 1A specifically highlighting the steps for handling cash equivalents. For comparison, steps in the process that do not apply to items classified as cash equivalents have been removed. As discussed in FIG. 1A, donated items are classified as one of three types. One particular type is cash equivalent item 108. Cash equivalent items include credit or credit card transactions, debit or debit card transactions, gift cards with a cash balance, electronic checks such as, for example, any electronic payment such as automatic clearing house (ACH), or payments derived from other billing services such as, for example, a mobile phone bill.

Once an item is identified as a cash equivalent, the system moves to process the item by assigning a value in step 114. Cash equivalents may be valued both as a gross donation and a net donation amount. Cash equivalent formats, such as credit versus debit, each have unique fees. For example, while all cash equivalent items valued at a $100 U.S. would all have the same gross value, each particular cash equivalent item would have a different net donation amount based on necessary fees. Additionally, a donor may also specify a frequency of the donation, which may be aggregated for the purpose of generating an impact statement. An impact statement is then generated for the item in step 116. Determining an impact statement is discussed above in reference to FIG. 1A and below in FIGS. 3A-E. For cash equivalents that have a frequency, such as monthly or yearly, the donations may be aggregated such that the impact statement is based upon the aggregate value of the donation. For example, a donor may specify that a donation item of $100 is to re-occur on a monthly basis for one year. The donation may thus be considered as a $1,200 item for the purposes of generating an impact statement.

Next, donor information is collected by the system in step 118. This information may be used by the donor or the beneficiary, or communicated to government agencies, if desired. Step 118 can take place at any point in process 100 but collecting the donor information after the generating the impact statement may be helpful in completing of the donation process. Collecting donor information may include requiring the donor to fill out a form, scan a check or a credit card, link to a social media site, or logging into the system.

Once the identification of the donor is complete, the system accepts the item in step 122. For cash equivalents, each specific type of asset involves different processes based on the item description. In particular, for debit and credit transactions, the system makes a charge to the donor's associated account. For an electronic payment, such as a wire transfer, the system sends instructions to the donor's indicated account manager. For gift card transactions, the donor's authorization is submitted to a gift card processor with electronic instructions to transfer the amount to the system's settlement account. There may be separate processing engines (e.g., at the backend server) for processing one-time cash equivalent donations and re-occurring cash equivalent donations. For example, one-time donations may be processed by charging the donor's associated account. Re-occurring donations may be processed by charging the donor's account and utilizing a scheduling engine to schedule future account withdrawals according to the frequency identifier. The re-occurring donations may share a common schedule identifier, but each donation of the re-occurring donations may each be assigned a unique transaction identifier. The scheduling engine may automatically process the re-occurring donations based upon the schedule identifiers. For example, each day the scheduling engine may determine which re-occurring donations are scheduled for that day, and automatically charge the appropriate donor accounts corresponding to the re-occurring donations without requiring additional donor input or other user input. These are merely provided as examples and are not intended to limit the described embodiments.

While cash equivalent items have the perception of being highly liquid, they may actually take several days to several weeks before their conversion process is complete. For cash equivalents, the backend server may also set a status identifier corresponding to the transaction to "complete" upon receiving authorization from the donor to transfer the funds from the donor, without waiting for the funds to be received. In some examples, the donor's financial institution may suspend transferring funds to the beneficiary until the institution's settlement process is complete. In this case, the system may float the funds to the beneficiary before the transaction is actually settled by the financial institution.

The acceptance step 122 completes the necessary data to provide substantive communications to the donor, the beneficiary, and any necessary reporting agencies. The system then proceeds to communicate any information about the transaction, which is discussed in more detail below, in reference to FIG. 1E.

Figure 1C:
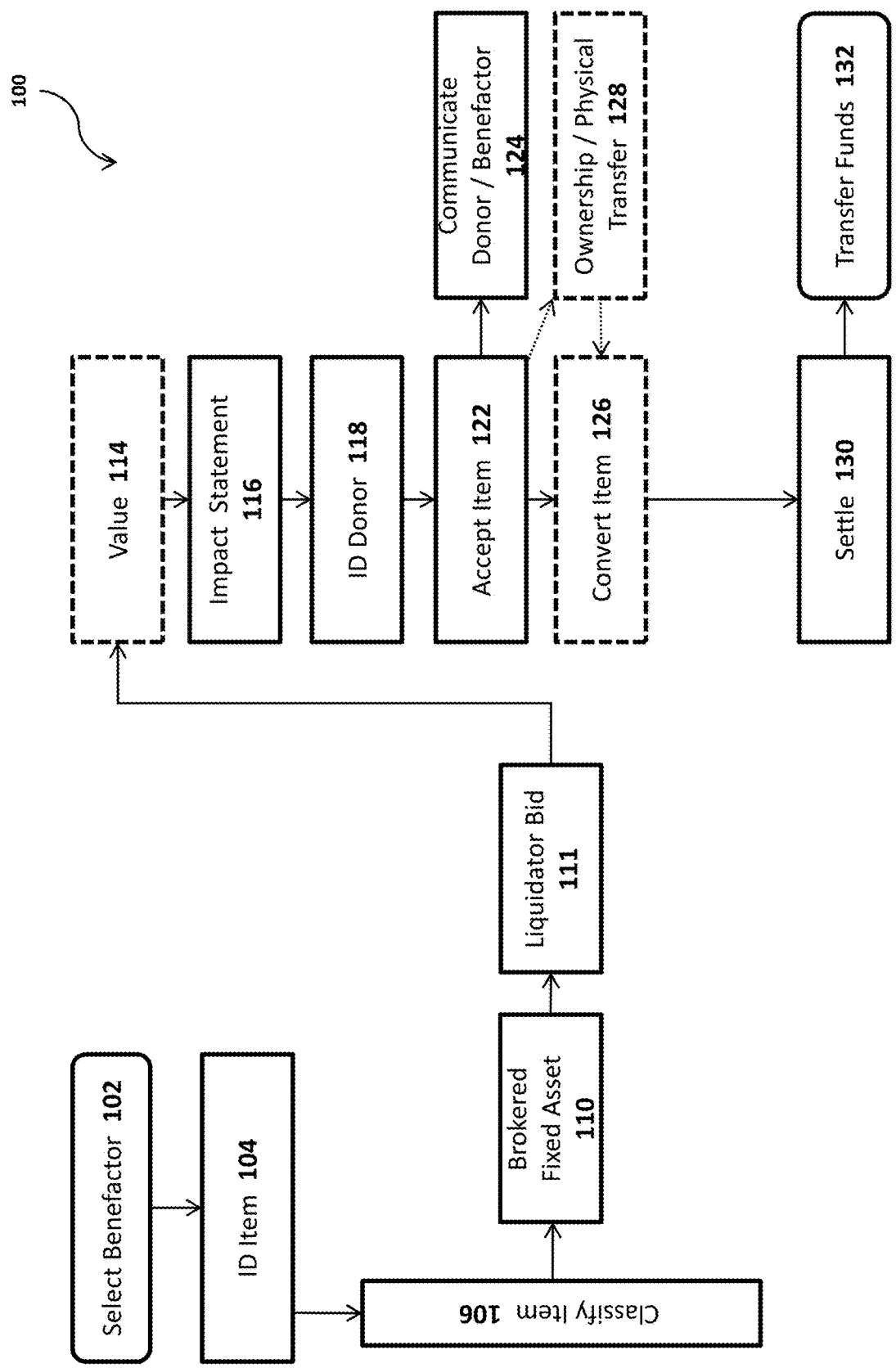
FIG. 1C illustrates the process of the integrated database system of FIG. 1A specifically highlighting the process for handling brokered fixed assets. For comparison, inapplicable steps for handling other asset classes have been removed.

FIG. 1C illustrates the process of the integrated database system of FIG. 1A specifically highlighting the process for handling brokered fixed asset items. For comparison, steps not required in processing brokered fixed asset items have been removed. As discussed in FIG. 1A, donated items are classified as one of three types. One particular type is brokered fixed assets 110. Brokered fixed assets include automobiles, boats, motorcycles, recreational vehicles, electronic devices or virtual currency. This list is provided only as an example and is not meant to be limiting.

Once an item is classified as a brokered fixed asset, a liquidator bid is generated in step 111. In some examples, the liquidator bid is referred to as a value assessment. The system (e.g., the backend server) may set the status identifier to "pending" for the transaction while waiting for the liquidator bid. To generate a liquidator bid, the backend server may send a request to a liquidator, which in some examples is a retail network or an auction house. The request may be sent either automatically upon receiving the description of the item, or based on input of a user of the backend server. For example, if the brokered fixed asset is an automobile, the backend server may compare mileage and model year with pre-configured thresholds. If the vehicle exceeds one or both thresholds, the request may be sent to an auction house, otherwise the request may be sent to the retail network (e.g., a network of automobile dealers). In another example, a user of the backend server may receive a notification regarding the pending transaction, and review the brokered fixed asset to make a manual determination regarding whether to send the request to the auction house or the retail network. In addition, the backend server may specify a minimum acceptable bid that is sent to the auction house. In some examples, the minimum bid is set by a user of the backend system. In other examples, the backend system queries one or more database to determine an appropriate minimum bid based on the description of the item (e.g., make, model, mileage, model year, condition and so forth).

Upon receiving the request, the liquidator may examine the description of the item, for example, electronically by matching the description provided by the donor to a database maintained by the liquidator. The liquidator may then generate a bid. The bid represents the value the liquidator is willing to pay for the item. Once received, the bid is stored in the item record and used as the base of the item's value. In step 114, the value of the item may be adjusted based on any required fees, such as liquidator fees or fees charged by the donation system. Thus, the item value determined in step 114 is the net value. Upon receiving a bid from the liquidator, the backend server may set the status of the transaction to "approved."

The system may then determine an impact statement in step 116. To determine the impact statement, the system may use either the liquidator bid or a donor estimated value (provided by the donor) of the item. As discussed above, the impact statement is determined by comparing the value against metrics provided by the beneficiary. In particular, a beneficiary may provide the system with metrics detailing the cost of providing a unit of service in order for the system to calculate how the donor's item will provide benefits for the beneficiary. For example, Meals on Wheel is able to deliver a senior one meal of prepared food for $7.00. The unit is $7.00/meal. With this information, the system may then determine the total impact for the donated item. In other words, using the above metrics, a $700 value would provide an impact statement such as:

"Your donation can be converted to 100 warm meals delivered to seniors or hospice care patients."

"You donated computer will provide a home-bound senior one year of warm meals delivered to their residence."

Determining an impact statement based on an item's value is discussed above in reference to FIG. 1A and FIGS. 3A-E.

Next, donor information is collected by the system in step 118. This information may be used by the donor or the beneficiary, or communicated to government agencies, if desired. Step 118 can take place at any point in process 100 but collecting the donor information after the generating the impact statement may be helpful in completing of the donation process. Collecting donor information may include requiring the donor to fill out a form, scan a check or a credit card, link to a social media site, or logging into the system.

Once the donor identification is complete, the system moves to accept the item in step 122. As part of the acceptance process, the system communicates with the donor and beneficiary about the item's acceptance as a donation in step 124. More specifically, the system communicates to the donor requirements for transfer of title to the liquidator. This communication may include packing and shipping instructions and a shipping label.

To complete the donation process, the donor then transfers title and possession of the item to the liquidator in step 128. If the system prepared packing and shipping instructions, the donor can simply use those to transfer the item to the liquidator. Upon receiving the item, the liquidator may communicate with the backend server to notify the backend server that the item has been received. The backend server may then set the status of the transaction to "transferred." Once the liquidator receives the item, it converts the item to funds to donate to the beneficiary in step 126. For example, the liquidator may sell the item to a buyer. The funds are then transferred to the system to settle the funds in step 130 and 132. Once the liquidator has received funds for the item, the liquidator may communicate with the backend server to notify the backend server that the item is sold. The backend server may then set the status of the transaction to "sold." While settlement usually occurs with transfer of funds, in some cases, fund transfer may occur after the settlement or the system may anticipate the funds that the liquidator will transfer and advance the amount to the benefactor before settlement. Once the liquidator transfers the funds to the benefactor, the backend server may then set the status of the transaction to "complete." The system may then generate a 1098-C form, which is transmitted electronically (e.g., email, uploaded to the donor's account, and so forth) and/or mailed.

Figure 1D:
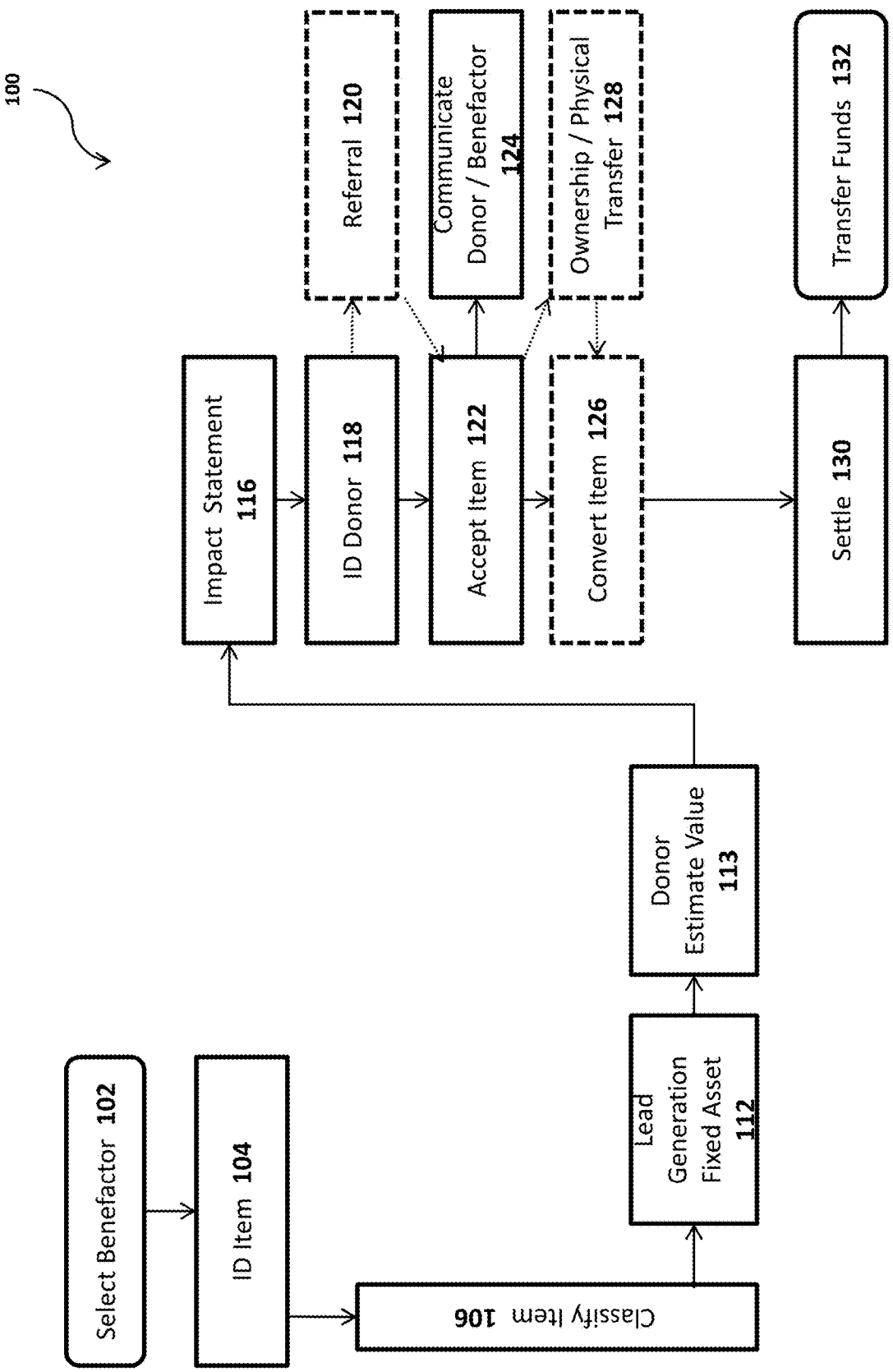
FIG. 1D illustrates the process of the integrated database system of FIG. 1A specifically highlighting the process for handling lead generation fixed assets. For comparison, inapplicable steps for handing other asset classes have been removed.

FIG. 1D illustrates the process of the integrated donation system of FIG. 1A specifically highlighting the process for handling lead generation fixed assets. For comparison, steps not needed for processing lead generated fixed assets have been removed. As discussed in FIG. 1A, donated items are classified as one of three types. One particular type is lead generation fixed assets 112. Lead generation fixed assets different from brokered fixed assets it is difficult for electronic liquidators to appropriately value lead generation fixed assets. Lead generation fix assets include real estate, business interest, securities, insurance, jewelry, commodity, and inventory. It may also include other assets associated with brokered fixed assets that are equally difficult to electronically value. For example, an automobile would normally be a brokered fixed asset but a classic automobile may be classified as lead generation fixed asset due to its uniqueness and the difficulty in identifying a market or resale potential.

Once an item is identified as a lead generation fixed asset, the system will proceed to determine a donor estimated value in step 113. For lead generation fixed assets, item valuation may be time consuming. In order to quickly process the asset and covert it to an amount, therefore encouraging donation, the system seeks a value for the item from the donor which is then stored in the item record.

In some examples, the item description may be reviewed by another user (e.g., via the backend server) to determine whether the item is approved for conversion to settled funds for donation. In some embodiments, the description examination and evaluation would be done automatically by electronically matching the description provided by the donor to a product database either local or remote from the system. For example, the item description may be parsed to identify keywords. The keywords from the item description may be compared with approved keywords (e.g., a whitelist) or non-approved keywords (e.g., a blacklist) in the product database. If the item is not approved for donation, the donor may be notified and the transaction aborted.

Once the value is entered by the donor (and the item is approved for donation, if applicable), an impact statement is determined in step 116. As discussed above, the impact statement is determined by comparing a value against metrics provided by the beneficiary. For lead generation fixed assets, the system does not rely on a third-party bid for determining the value that is used in determining the impact statement. Instead, the system uses the donor estimated value. Determining an impact statement based on an item's value is discussed above in reference to FIG. 1A and FIGS. 3A-E.

Next, donor information is collected by the system in step 118. This information may be used by the donor or the beneficiary, or communicated to government agencies, if desired. Step 118 can take place at any point in process 100 but collecting the donor information after the generating the impact statement may be helpful in completing of the donation process. Collecting donor information may include requiring the donor to fill out a form, scan a check or a credit card, link to a social media site, or logging into the system.

Once the donor information is obtained, the system sends a referral for a bid to a system that retrieves bids from potential buyers in step 120. The system (e.g., the backend server) may set the status identifier to "pending" for the transaction while waiting for bids. The potential buyer can examine the description of the item and take any needed action to identify the value of the item. In some embodiments, the description examination and evaluation by the potential buyer would be done electronically by matching the description provided by the donor to a database either local or remote from the system. The buyer may then provide a bid to the system (e.g., the backend system and/or donor system) which is used to establish a value for the item. This value may also be stored in the item record. The bid offer may provide an instantaneous response from the donor or be delayed in an extended period of value determination and negotiation. Upon receiving a bid from a buyer or acceptance of the bid from the donor, the backend server may set the status of the transaction to "approved."

Once the final bid is determined, the buyer accepts the item and the system records the acceptance in step 122. The system then communicates to the donor the requirements for transferring title of the item to the liquidator/buyer in step 124. This communication is highly dependent on the item. For items that can be shipped, the system may include packing and shipping instructions and a shipping label. Additionally, the system may notify the benefactor of the donation and the amount of funds that will be transferred to the benefactor.

To complete the donation process, the donor may then transfer title (if required, and possession of the item to the liquidator/buyer in step 128. If the system prepared packing and shipping instructions, the donor can simply use those to transfer the item to the liquidator. Once the liquidator/buyer receives the item, the backend server may then set the status of the transaction to "transferred." The liquidator/buyer may then provide funds for the item that are then donated to the beneficiary in step 126. Upon receiving funds for the item, the backend server may then set the status of the transaction to "sold." The funds are then transferred to the system to settle the funds in step 130 and 132. Once the funds are settled, the backend server may set the status of the transaction to "complete." While settlement usually occurs with transfer of funds, in some cases, fund transfer may occur after the settlement or the system may anticipate the funds that the liquidator/buyer will transfer and advance the amount to the benefactor before settlement.

Figure 1E:
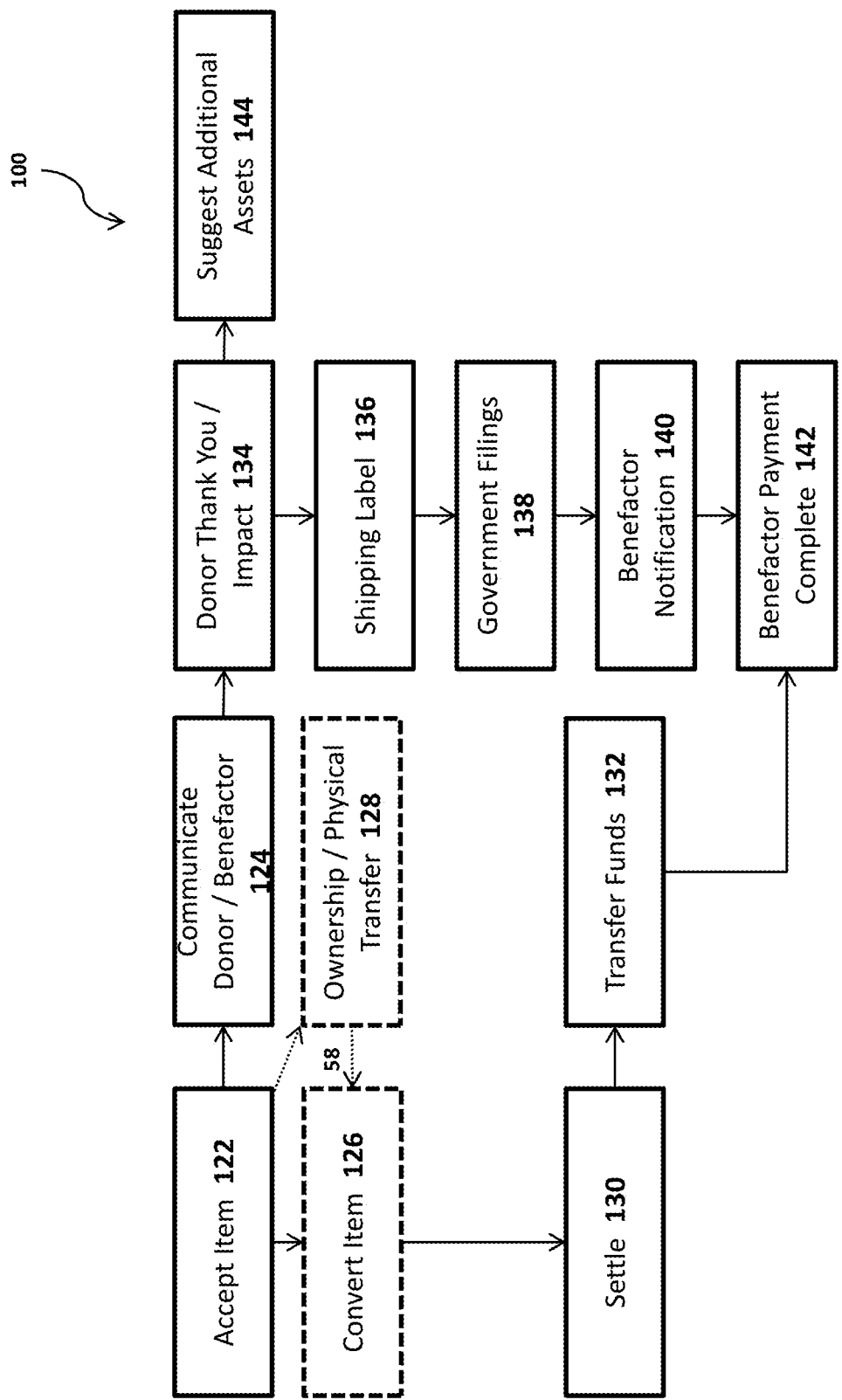
FIG. 1E illustrates expanded features of the process of the integrated database system shown in FIG. 1A specifically directed to communication with parties to the donation.

FIG. 1E illustrates expanded features of the process of the integrated database system shown in FIG. 1A specifically directed to communication with parties to the transaction. In particular, acceptance in step 122, no matter the item's classification, completes the necessary data to provide substantive communications to donor, the beneficiary, or and necessary reporting agencies. Once acceptance occurs, the system may proceed with a number of communication related steps. Communication may be in the form of an on-screen representation, electronic messaging, social media postings, or even a paper format.

For example, in step 134, the system provides a thank you message that includes an impact statement to the donor. The impact statement may be an automatically generated written statement, a graphical representation of the impact, or a combination of both. This communication may also suggest additional items from the same or different classes that can also be donated. This suggestion may be generated, in part, based on the beneficiary's, the donor's, or other donors' donation history in step 144.

For items that require shipment to be converted to funds, such as some brokered fixed assets and lead generation fixed assets, shipping labels and instructions may be communicated in step 136. These may be printed at the system or communicated to the donor's system to print at the donor's request.

In some cases, organizations or agencies may be notified of the donation in step 138. For example, donation information may need to be communicated to government agencies for filings such as taxes, title transfers. Other non-government entities may need to be notified for securities or corporate interest reporting.

In addition to the reporting in step 138, details of the transaction may also be communicated to the benefactor in step 140. This communication may also include details about the system's process, timing of the item's conversion into actual funds, settlement, and anticipated timing of fund transfers. Finally, after the item is converted, physically transferred, or settled, the funds are transferred to the benefactor and the benefactor receives a communication that payment is complete in step 142.

The process described above in FIGS. 1A-1E are merely example embodiment and are not intended to limit the types of assets or the process by which assets may be converted into cash for donation to a benefactor.

Figure 2:
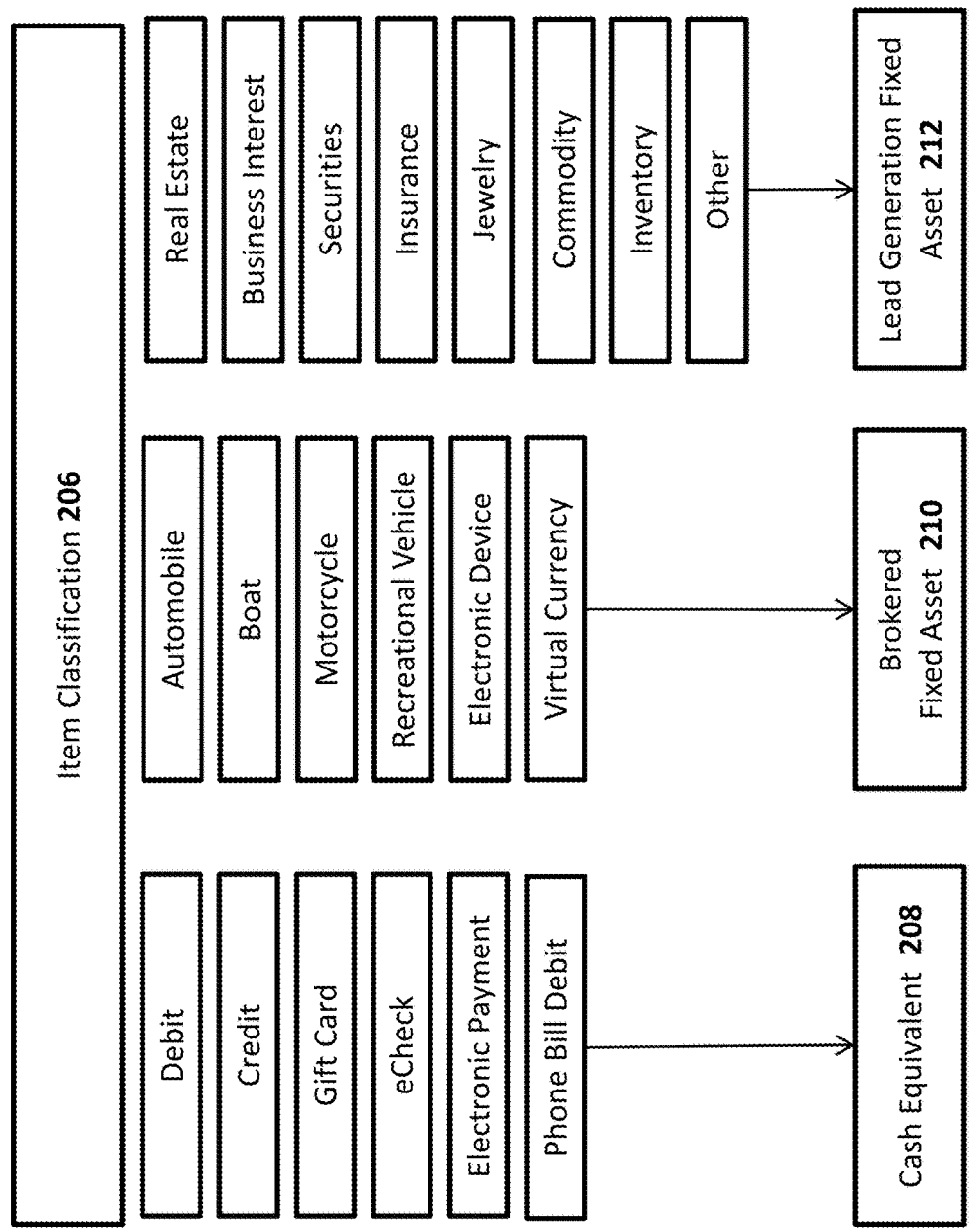
FIG. 2 illustrates a process for classifying an item to determine a particular processing path within the integrated database system.

FIG. 2 illustrates a process 200 for classifying an item to determine a particular processing path within the integrated donation system described in FIGS. 1A-E. As discussed above, the integrated database system is designed to process at least three types of asset classes—cash equivalents 108, brokered fixed assets 110, and lead generation fixed assets 112. In some embodiments, once the system receives item description from the donor, the item is classified by comparing the description against a product database either local or remote to the system.

First, the item is compared against known cash equivalents in the product database. Known cash equivalents include debit or debit card transactions, credit or credit card transactions, gift cards with a cash balance, electronic checks including any electronic payment such as automatic clearing house (ACH), and payments derived from other billings, such as a mobile phone bill. If the item meets any of the known cash equivalents already described in the product database, the item may be classified and processed by the system as a cash equivalent. Although some items like gift cards may meet the description of cash equivalents, they may require reclassified to brokered fixed assets if converting the item to funds requires processing through a broker or liquidator.

Next, the item is compared against known brokered fixed assets in the product database. Brokered fixed assets are those assets that are efficiently converted to funds through an automated or partially automated process by a third-party vendor contracted to provide instant bids on a group of pre-determined items. Known brokered fixed assets may include, for example, automobiles, boats, motorcycles, recreational vehicles, electronic devices, and virtual currency. The benefit with classifying an item as a brokered fixed asset is that the system can establish an instant value for the item in order to then calculate an impact statement.

Finally, items that do not fall into either the cash equivalent or brokered fixed asset classifications are classified by the system as lead generation fixed assets. Lead generation fixed assets may include, for example, real estate, business interest, securities, insurance, jewelry, commodities, and inventory. Generally speaking, though, lead generation fixed assets are different than brokered fixed assets because the system is unable to quickly obtain a third-party valuation. This may be due any number of reasons including, for example, government regulations, asset complexity, poor liquidity, rarity, etc. Despite these valuation challenges, though, the system continues the donation process by obtaining an initial value for the item from the donor.

Figure 3A:
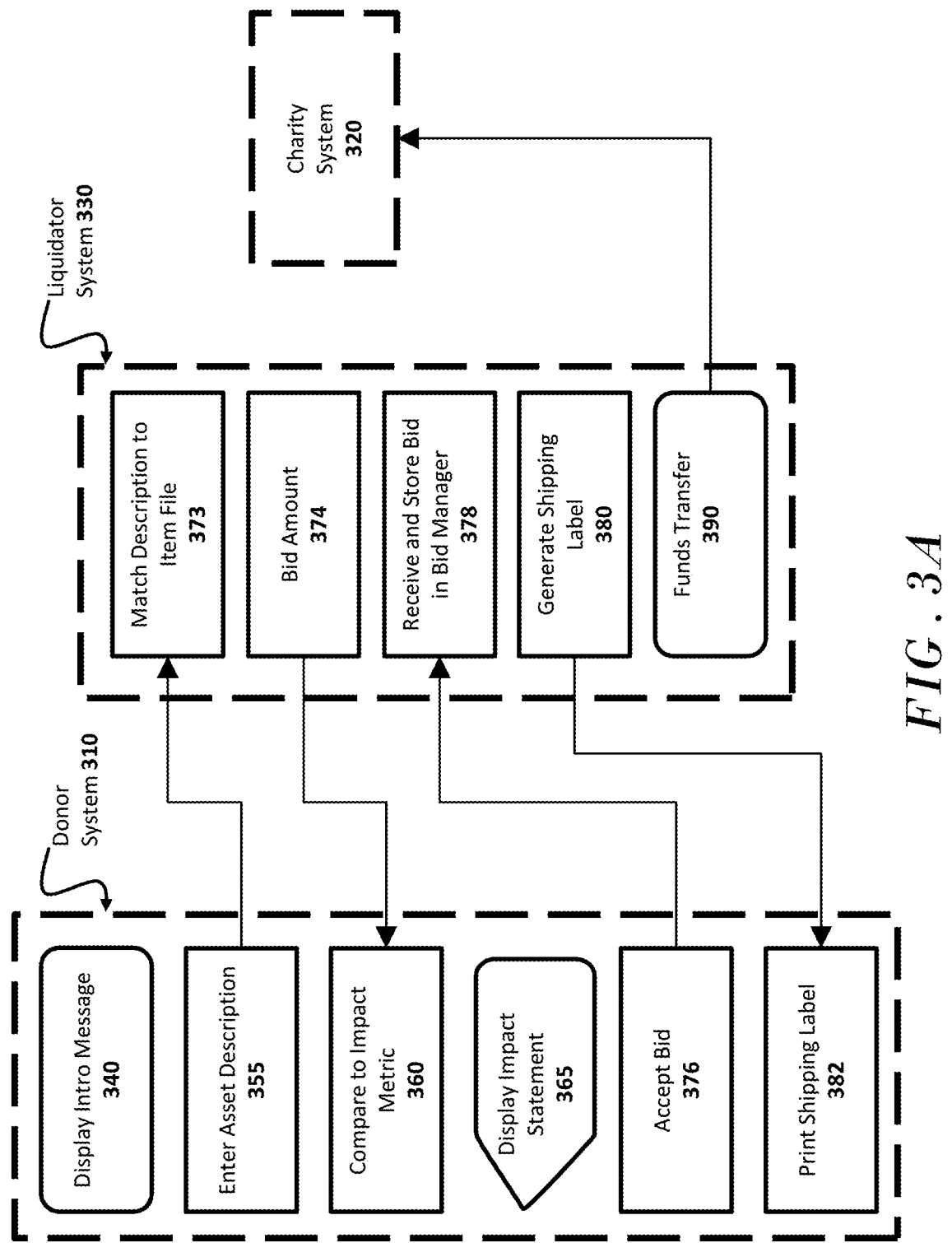
FIG. 3A illustrates the data movement between the donor systems, liquidator systems, and the charity systems.

FIG. 3A illustrates the flow of data and processes within and between a donor system 310, a liquidator system 330 and a charity system 320.

The process begins by at 340 by displaying an introductory message at a donor system 310. Typically, the introductory message is a web page accessible via the Internet or another type of message deliverable via an electronic medium. The message may explain the goals of a charity, the successes of the receiving institution, the global impact, or specific impacts to individuals or groups. Additionally, it may be desirable to quantitatively demonstrate how the user's anticipated donation would impact the individuals served by the charity. Accordingly, the introductory message 340 may also include an explanation of the outcome of the potential donation, display images showing the outcome of the donation, basic instructions to complete the form, pop-up detailed help, audio files, and/or video files.

Following the directions of the introductory message 340, the potential donor enters an asset description in step 355 to begin the process of receiving an individualized impact statement in step 365. In an embodiment, instead of using classification or categories, the description results in a specific identification of the asset to be donated.

Figure 3B:
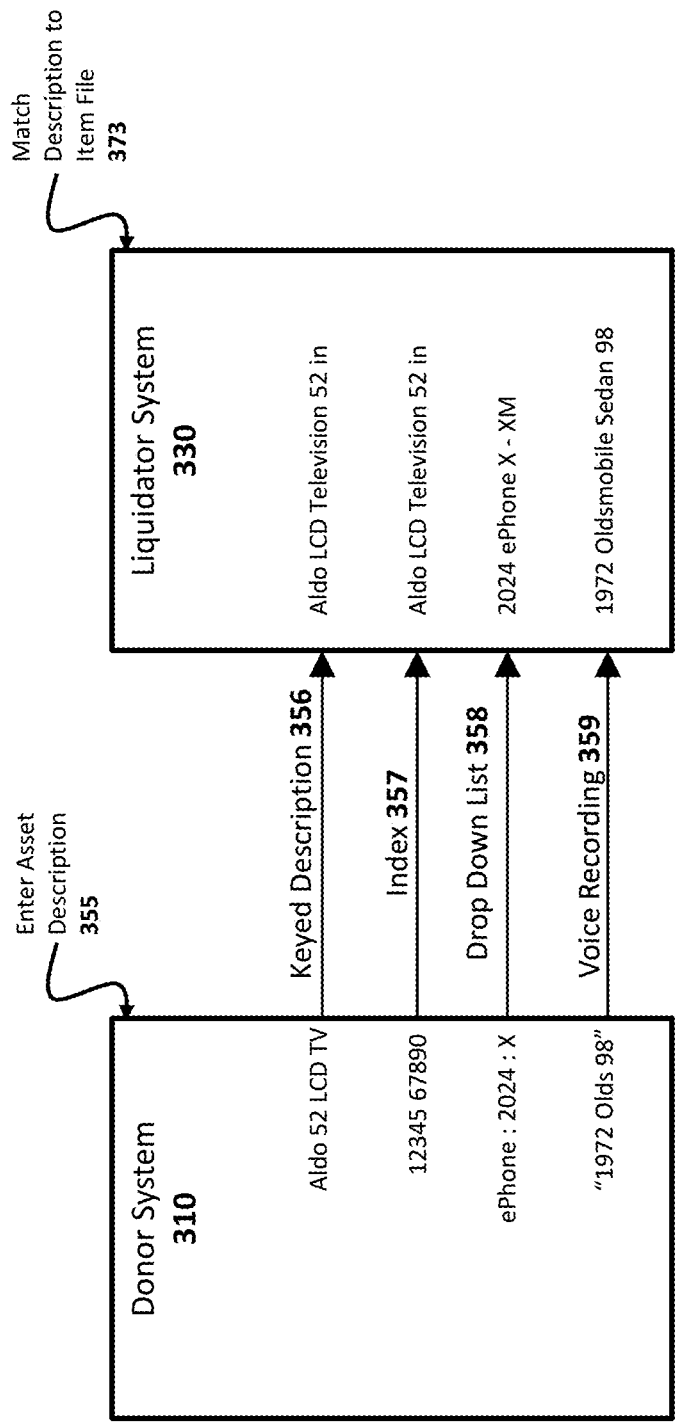
FIG. 3B illustrates various methods for entering and matching the asset description.

For example, entering the specific asset description can be done by using a number of methods further detailed in FIG. 3B. Turning briefly to FIG. 3B, in one preferred embodiment, the user enters an alphanumeric asset description such "Aldo 52 LCD TV." This may be done in several ways including, for example, typing a description 356 into the user interface, selecting a specific asset from a drop down list 358, entering a specific item index 358, or another entry method such as using a voice recording 359. A combination of entry methods may also be used. For instance, a user could begin typing "ALD" and be provided an instantaneous drop down list 358 of selections, such as:

Aldo 30 LED Television
Aldo 32 LCD Television
Aldo 32 LCD Monitor
Aldo 40 Monitor with Antenna
Aldo 52 LCD Television The prospective user would then select the item from the resulting drop down list 358.

In another embodiment, a user could enter an asset description by supplying an index 357 to the interface such as a keyed product serial number or a scanned barcode. The resulting key may be matched against a file or database entry within the donor system 310 or the liquidator system 330. In yet another embodiment, the donor system 310 could create a voice file 359 from the donor. The voice file 359 may be translated to text by the operating system, translated into text by the donor system 310 or the liquidator system 130.

By way of example, the process illustrated in FIG. 3B may be carried out as follows: The potential donor enters a description which is then transmitted to the liquidator system 330 to match the description 355 to an item record in a database. In the example of FIG. 3B, the user may type "Aldo 52 LCD TV" in the donor system 310 which would then be transmitted to the liquidator system 330 responsible for matching the description to the item record and returning a similar but uniform description such as "Aldo LCD Television 52 in." In the case of entering the asset description 355 using an index 357 the consumer would key or scan a code (e.g., "12345-67890") in the donor system 310 that is then transmitted to liquidator system 330 and matched to an item record that carries the key or code. In the third example, a user may select "ePhone" from a drop down list 358, then select "2024" model and "X" submodel designation. This may be done within a single drop down list or multiple hierarchical drop down lists. The resulting description of "ePhone:2024:X" may then be transmitted to the liquidator system 330 to match the description against the item record resulting in the description of "2024 ePhone X-XM." A final example would record the user's voice into a voice recording file 359 within the donor system 310 and transmit either the translated text or the voice file 359 itself to liquidator system 330. The resulting voice or text may then be matched to an item record.

Returning to FIG. 3A, once the description has been matched to the item record in step 373, the liquidator system 330 retrieves an associated bid amount from item record in step 374. The bid amount may be stored in the item record, calculated based on information stored in the item record, or retrieved from a third party and then matched to the description in item record. The bid may include additional information such as, for example, a transaction identifier, the asset description, and a bid amount. The bid may then be stored in a bid manager database in step 378.

The bid amount may then be transmitted to the donor system 310 in order to prepare an impact statement. To prepare the impact statement, the bid amount is compared to an impact metric in step 360 which can be stored on the donor system 310. The impact metric may include, for example, the cost of delivering a single service or product to the entity or individuals served. For instance:

1 pair of shoes: $3.19
1 day of meals: $0.78
1 semester of job training: $448.00
1 laptop with software: $249
30 days of fresh water: $12.49
1 campaign stop: $700.00

As an example of comparing an impact statement to a bid amount, if the bid amount 74 for a particular asset is $1,400.00, the above example impact metrics would result in the following impact statements:

439 pairs of shoes, or
1,795 days of meals, or
3 semesters of job training, or
6 laptops with software, or
9 years, and 4 months of fresh water, or
2 campaign stops.

In step 365, the impact statement can be displayed to the user at the donor system 310 to encourage the user make a donation. If the user accepts the bid amount in step 376, the systems may then begin the processes for collecting the asset and distributing the funds to the charity. To accept the bid amount in step 376, the donor may be shown the actual bid amount or just the impact statement. The user may accept, or approve, either the bid amount or the impact statement.

The user may also be shown multiple impact statements for which the user may select one or more depending on the bid amount and the asset's value.

Upon the user accepting one or more bid amounts or impact statements, the donor system 310 transmits the acceptance to a bid manager in the liquidator system 330 where it is received and stored in a database in step 378. The liquidator system 330 may then generate a shipping label in step 380. In one embodiment, the shipping label may be transmitted to the donor system 310 for printing in step 382. Step 382 also contemplates that the shipping label may be transmitted to the user via other means such as email or another electronic message. The shipping label may also be shipped to the user where the shipment may include packing and shipping materials to assist the user in the efficient donation of the asset.

In the last step of FIG. 3A, the liquidator system 330 transfers funds to the charity system 320. As used herein, the charity system 320 may include a server managed by a particular charity, a server managed by third-party on behalf of the charity, a banking institution acting as a receiver for a charity, or a third-party to convert the funds into the promised impact. Funds that can be transmitted to the charity may include cash, cash equivalents, points, promises, and/or goods or services.

Figure 3C:
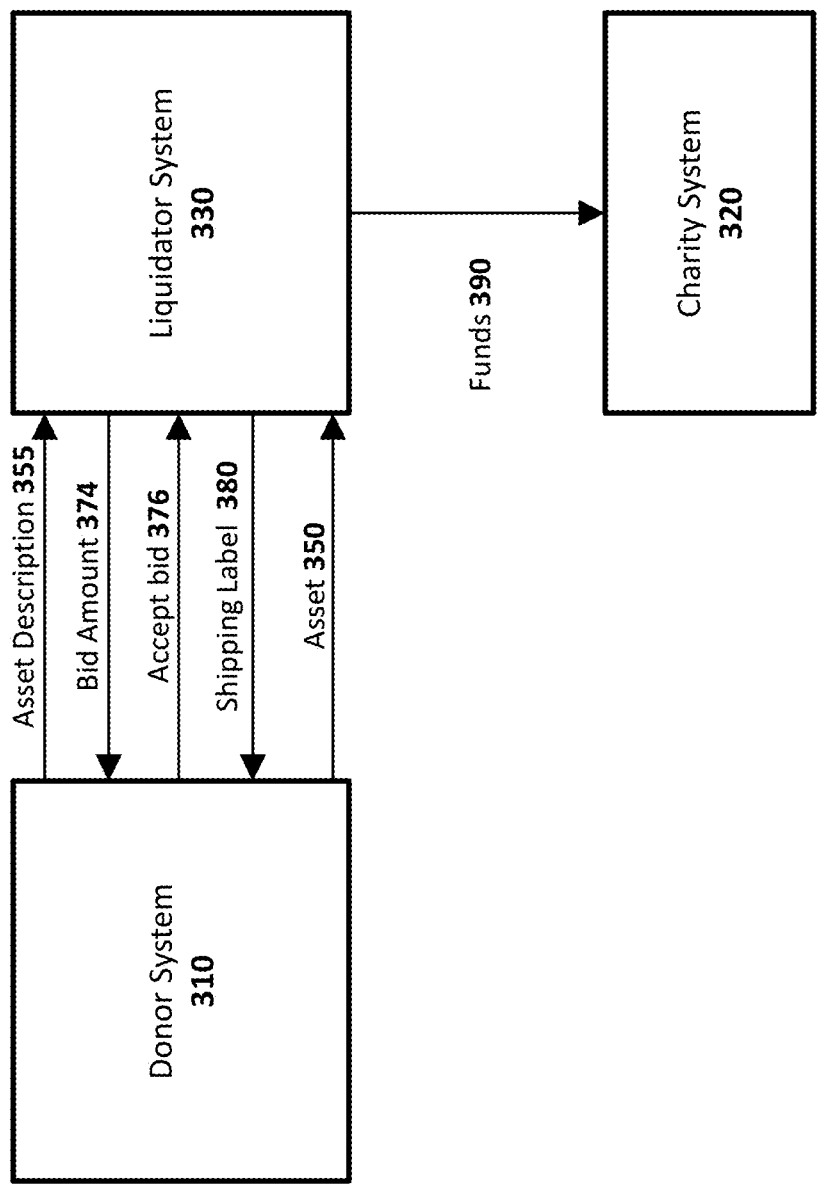
FIG. 3C illustrates the communications and asset exchanges between the donor, liquidator and charity.

FIG. 3C illustrates an example exchange of data and assets between a user, a liquidator system 330, and a charity system 320. Before examining the role for the manager of the consumer-facing donor system 310, it is helpful to understand the fundamental exchanges of data and assets. The process begins by a user supplying a description of the asset in step 355. The description must be detailed enough for a liquidator system 330 to provide a committed bid amount. The description may include a manually typed description; an index such as a serial number or scanned barcode; a drop down list; a voice file; or any combination thereof.

A user, as used herein, may include any individual, business, organization, entity, computer system and/or the like attempting to donate assets to another individual, charity, political campaign, business, organization, entity, or computer system. A charity, as used herein, comprises any individual, non-profit, for-profit, business, organization, political campaign, lobbyist, entity, computer system and/or the like.

Once the asset description is received, the liquidator system 330 converts the description into a bid amount and transmits the bid amount to the donor system 310 in step 374. The bid amount is presented to the user as an impact statement. The user may then accept the bid amount by approving either the bid amount or the impact statement, whereby the acceptance is transmitted to the liquidator system 330 in step 376. In step 380, after the liquidator system 330 receives the accepted bid, the liquidator system 330 then provides shipping instructions to the user via donor system 310. The shipping instructions can include, for example, a shipping label, packing instructions, and/or drop-off or delivery information. The shipping instructions may also include a transaction identifier, identification of the asset(s) to be shipped, the name and address of the shipper, name and destination for the asset(s) to be shipped, payment consideration for the shipping costs, and/or information about the impact of the asset donation.

At any time after the bid is accepted in step 376, the liquidator system 330 may provide funds consisting some portion of the bid amount to the charity system 320 in step 390.

Figure 3D:
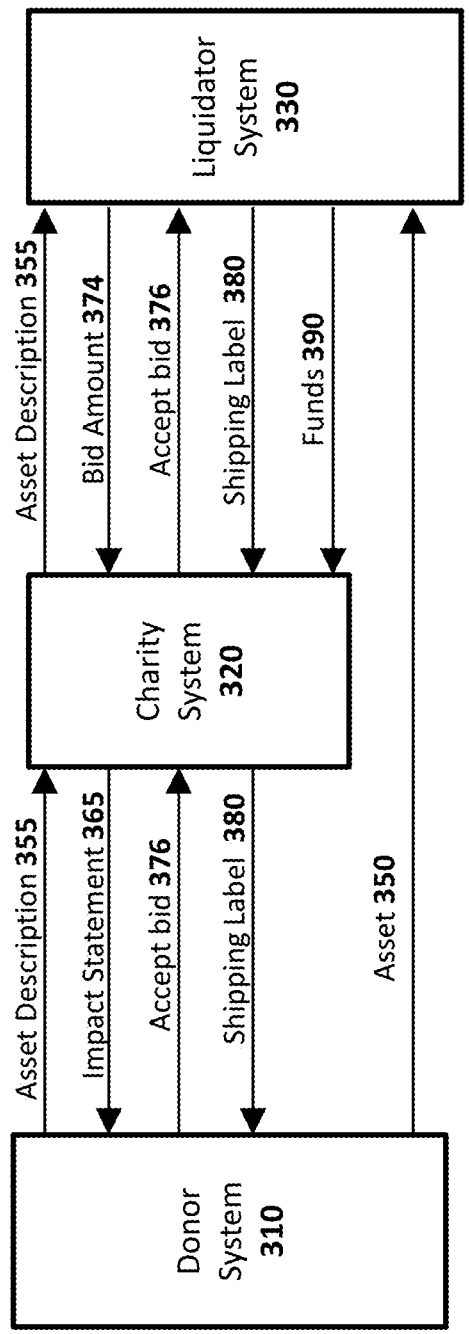
FIG. 3D illustrates the use of the invention when the charity acts as the intermediary between the donor and the liquidators.

FIG. 3D illustrates the charity system 320 acting as the facilitator of the relationship between the donor system 310 and the liquidator system 330. In this embodiment, the charity system 320 may receive the asset description from the donor system 310 and transmit the description to the liquidator system 330 in step 355. The liquidator system 330 may then generate a bid based on the asset description that includes a bid amount. The bid amount can then be transmitted to the charity system 320 in step 374 to be converted to an impact statement. The impact statement generated from the bid amount may then be transmitted to the donor system 310 in step 365.

The impact statement and/or the bid amount may be presented to the user via a web page or similar at the donor system 310. The user may then accept the bid amount or impact statement at step 376 by selecting an acceptance option in the web page. The user's acceptance is then transmitted to the liquidator system 330 via the charity system 320. The liquidator system 330 may then transmit shipping information comprising at least a shipping label to the donation system 310 via the charity system 320 in step 380. The transmission to donor system 310 may be via an electronic message including, for example, email or web notification, or another means such as regular mail with additional shipping materials.

In step 350, the user may then send the asset to a party designated by the liquidator system 330 on the provided shipping information. Any time after the liquidator system 330 receives the user's acceptance of the bid amount or impact statement in step 376, the liquidator system 330 would forward all or a portion of the bid amount, as funds to the charity system 320 in step 390.

Figure 3E:
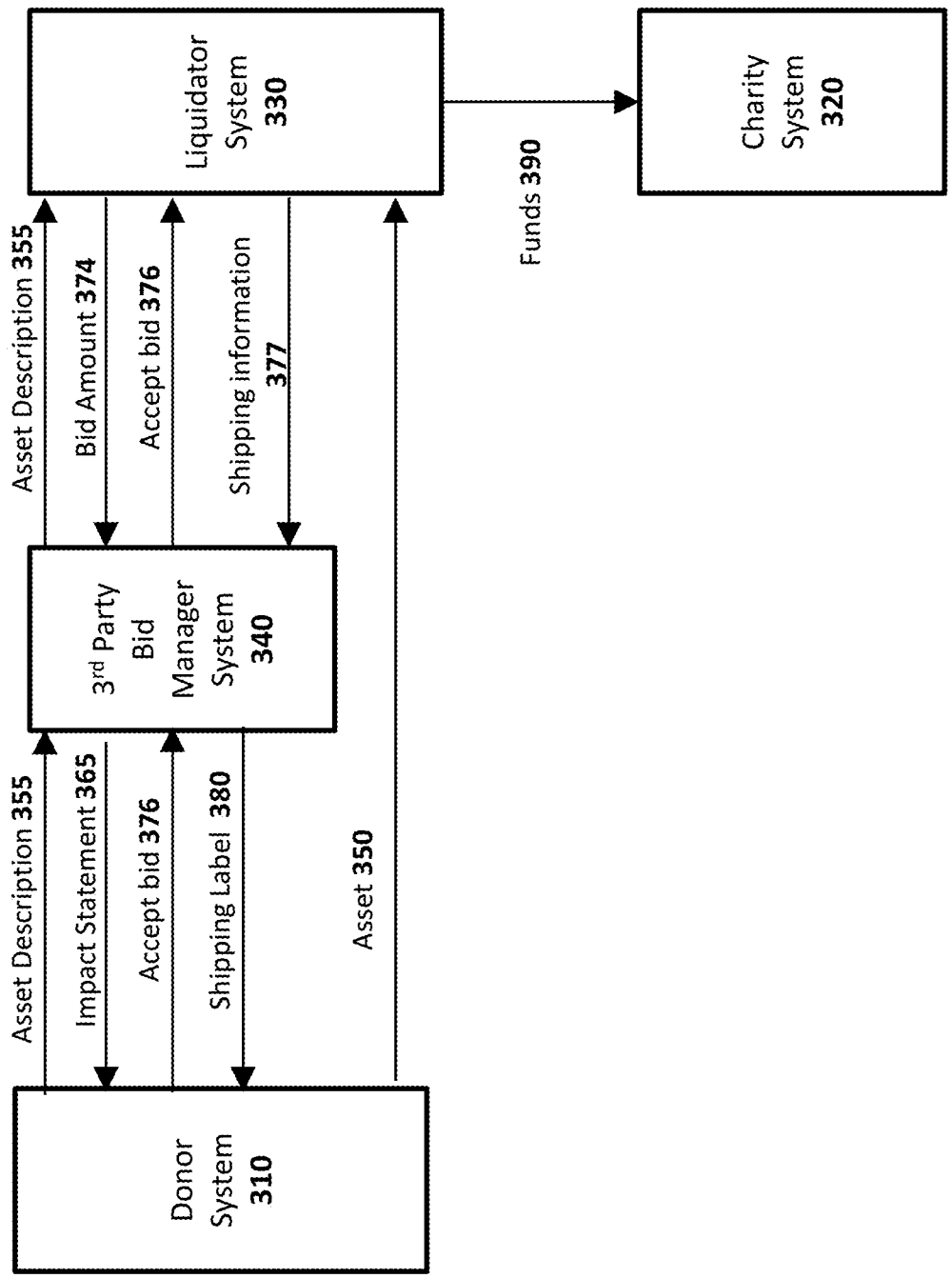
FIG. 3E illustrates a system embodiment being used with a third-party provider facilitating the communication and movement of assets between the donor, liquidator, and charity.

FIG. 3E illustrating the use an embodiment where a third-party 340 manages the communications between the donor system 310 and the liquidator system 330 and the charity system 320. In contrast to FIG. 3D, the third-party manager system 340 acts a representative for the charity system 320 and may give the appearance to a user that the donor system 310 is interacting with the charity system 320 directly. The third-party manager system 340 may also appear to the donor system 310 as representing a group of charities systems 320 and displaying the impact from multiple charities in one or more impact statements.

In step 355, the donor system 310 electronically supplies an asset description to the third-party system 340 which is electronically relayed to the liquidator system 330. The liquidator system 330 then matches the asset description to an item record stored in a database and generates a bid which comprises at least a bid amount in step 374. The third-party system 340 then compares the bid amount to an impact metric and generates an impact statement in step 365, which is then transmitted to the donor system 310 for display. The user, via donor system 310, may then accept the impact statement via a command entered in a user interface on donor system 310. The user's acceptance may then be transmitted to the liquidator system 330 via the third-party manager system 340 in step 376. In step 377, the liquidator system 330 may communicate to the third-party system 340 shipping information to facilitate the third-party manager 340 to generate a shipping label. The shipping label may then be transmitted to the donor system 310 in step 380 for the user to print or otherwise access. The user may then ship the asset to according to the shipping label in step 350. At any point after the user's acceptance of the impact statement is received, the liquidator system may transmit funds consisting of at least a portion of the bid amount to the charity system 320.

Figure 4:
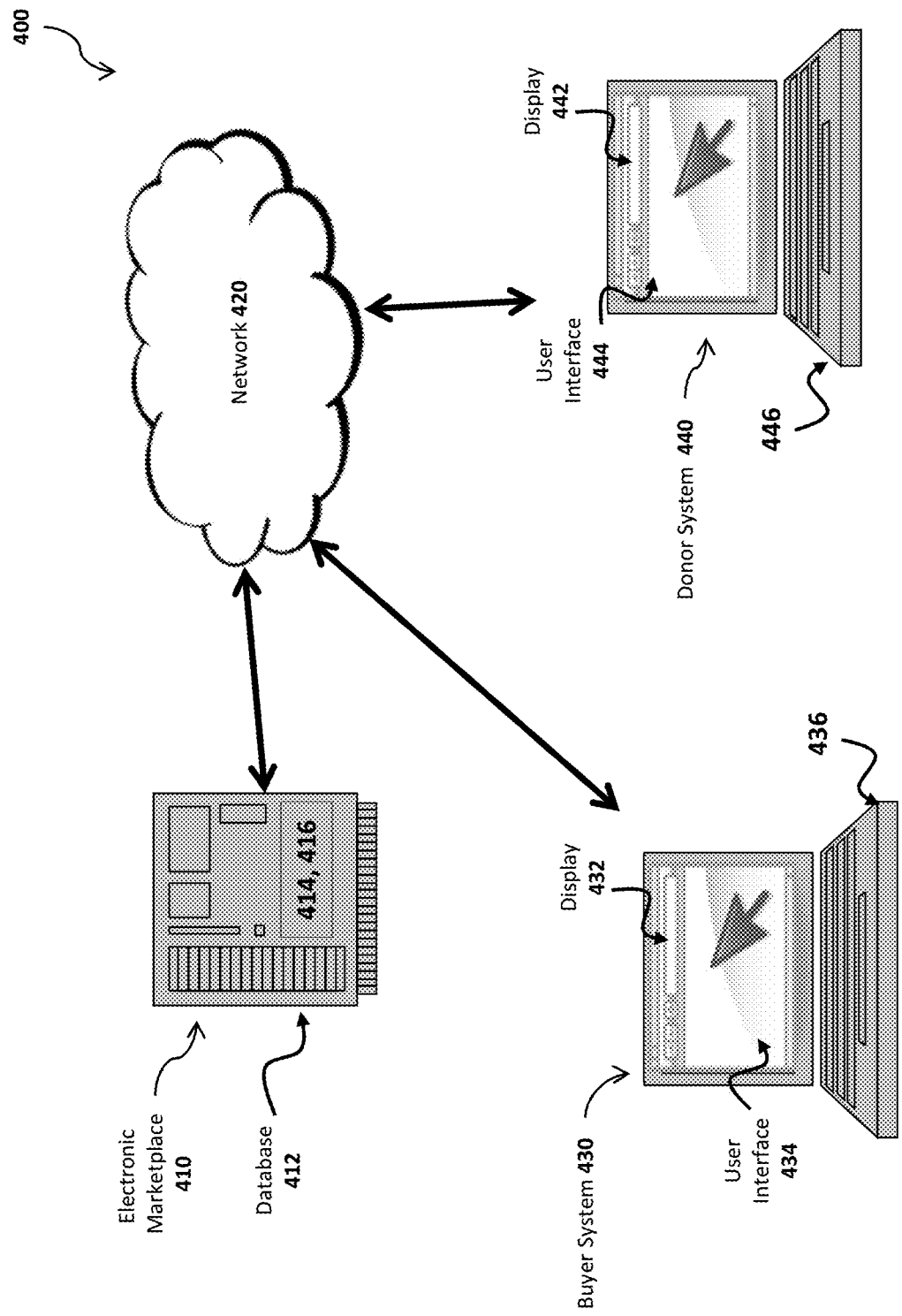
FIG. 4 illustrates an example computer system that may be used to carry out the integrated donation system.

FIG. 4 illustrates an example computer system 400 that may be used to carry out the process of the integrated database system described in FIGS. 1A-E, 2, and 3A-E. System 400 includes an electronic marketplace system 410, a buyer system 430, and a donor system 440. These systems are connected via a network 420 such as, for example, the Internet. Electronic marketplace 410 may be the system for implementing the various aspects of the systems described in FIGS. 1A-E, 2, and 3A-E, and may also be referred to as a backend server. Marketplace 410 includes one or more computer processors 414, memory 416, and may include a database 412 for storing item classification information. Buyer system 430 and donor system 440 include and number of computer devices such as, for example, mobile computers, personal computers, personal digital assistants, smart phones, tablets, laptops, wearable computers, ultra-mobile personal computers, enterprise digital assistants, electronic book readers, minicomputers, mainframes, servers, workstations, minicomputers, microcomputers, desktop computer, clones and terminals.

In some embodiments, to conduct the process described in FIGS. 1A-E and 2, the donor begins by transmitting personal data via donor system 440 to the electronic marketplace 410 to establish an account. The account may include information about the donor such as name, address, government identification information, preferred benefactors, donation history, and item search history. This list is not exclusive and is not intended to limit the embodiments.

The buyer may also transmit personal information via buyer system 430 to create an account. The buyer's information may include information listed above for a donor's account as well as additional information such as, for example, shipping information and payment information. As discussed above in FIGS. 1C-D, when a donor proceeds with a transaction at the electronic marketplace 410 that requires a buyer, the buyer may receive notification of the item for sale via buyer system 430. In some embodiments, the buyer may provide the system with a wish list (e.g., a list of assets or types of assets) so that the buyer is notified only about items that the buyer is interested in. In this case, the buyer will only be notified when a broker fixed asset or lead generation fixed asset matching its requirements is available for purchase. From the buyer system 430, the buyer can examine the description of items. In a preferred embodiment, the description examination is done electronically at the buyer system 430 by matching the description generated by the donor to a database local or remote to buyer system 430. The buyer may then purchase the item, whereby the necessary transaction information is transmitted from buyer system 430 to the electronic marketplace 410.

FIG. 5 illustrates an example process 500 between donor system 570, buyer system 575, and benefactor system 580. As described above in reference to FIGS. 1A-E, 2, and 4 these process steps may take place at an electronic marketplace system.

Process 500 begins in step 510. Step 510 includes soliciting asset donations from a donor via donor system 570. Typically, a web page associated with a benefactor may explain the goals of the benefactor, their successes, the global impact, or specific impacts to individuals served. In some embodiments, in order to invite a potential donor to make a donation, an introductory message is displayed inviting participation. The message would alternatively or collectively explain the outcome of the donation, display images showing the resulting impact of the donation (e.g., an impact statement), basic instructions to complete the form, pop-up detailed help, audio files, video files, or other instructional material.

Following the solicitation step 510, the potential donor enters an asset description to begin the process of receiving an individualized impact statement in step 520. Entering of the specific item description can be performed using a number of methods discussed above. For example, the donor may enter an alphanumeric asset description such as "See 52 LCD TV." This may be done through donor system 570 by typing a description, selecting a specific asset from a drop down list, or a combination of both a keyed description and a drop down list. In other words, a donor may begin typing "See" and be provided an instantaneous drop down list of selections, such as:

See 30 LED Television
See 32 LCD Television
See 32 LCD Monitor
See 40 Monitor with Antenna
See 52 LCD Television The prospective donor would then select a particular item from the resulting search list. Alternatively, the item description may be entered using an index that could be keyed-in or scanned such as a UPC.

Once entered, the item description is transmitted to the buyer system 575 and matched to a description provided by the buyer system 575. The buyer system 575 may then retrieve an associated bid amount in step 530. The bid amount includes a transaction identifier, an asset description, an amount or value. The bid amount is transmitted to the donor system 570 to prepare an impact statement to display to the prospective donor. The impact statement is then generated and can be displayed to the perspective donor in step 540 to encourage the prospective donor to continue with the asset donation. If the prospective donor accepts the bid amount in step 540. In some embodiments, the donor may not be shown the actual bid amount. Instead, the donor may accept, or approve, bid based only on the impact statement. In this case, the donor may select multiple impact statements or only a single impact statement.

Once the bid amount is accepted, the acceptance is transferred to the buyer system 575 and stored in step 545. In response to the bid acceptance, the buyer system 575 may generate shipping information in step 550 for those assets that can be shipped. The shipping information may then be transmitted to the donor system 570 for printing by the donor in step 555. The buyer system 575 may also email the shipping information to the donor or print and then ship the information to the donor. The shipping information may include packing and shipping materials to assist in the efficient transfer of the item.

Finally, the buyer system 575 transfers funds to the benefactor system 580 in step 560. The benefactor system 580 may be a server managed by a benefactor, a server managed by a third-party on behalf of the benefactor, a banking institution designated to receive the funds, or a third-party designated to convert the funds into the promised impact.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

In the foregoing description, and the following claims, method steps and/or actions are described in a particular order for the purposes of illustration. It should be appreciated that in alternate embodiments, the method steps and/or actions may be performed in a different order than that described. Additionally, the methods described above may be embodied in machine-executable instructions stored on one or more machine-readable mediums, such as disk drives, thumb drives or CD-ROMs. The instructions may be used to cause the machine (e.g., computer processor) programmed with the instructions to perform the method. Alternatively, the methods may be performed by a combination of hardware and software. While illustrative and presently preferred embodiments have been described in detail herein, it is to be understood that the inventive concepts may be otherwise variously embodied and employed, and that the appended claims are intended to be construed to include such variations, except as limited by the prior art.

What is claimed is:

1. A method,
comprising:
displaying, via a website and on a display screen of a computer, an introductory message associated with a nonprofit entity;
receiving, via the website, a description of a to-be-liquidated item,
   wherein the to-be-liquidated item is to be converted to funds, which are to be received by the nonprofit entity;
generating, using a backend server, an item record, the item record comprising a transaction identifier that identifies a transaction by which the to-be-liquidated item is to be converted to the funds;
   wherein the backend server is in communication with the computer via a network;
   wherein generating the item record comprises:
     providing, using the backend server, a web interface in embedded code on the website, the embedded code including:
      a designation identifier associated with the nonprofit entity, wherein the designation identifier identifies the nonprofit entity that will receive the funds from the conversion of the to-be-liquidated item; and
      a campaign identifier associated with a campaign of the nonprofit entity;
     automatically inserting, using the embedded code and on the backend server, the designation identifier and the campaign identifier in the item record,
     wherein the designation identifier and the campaign identifier are automatically inserted into the item record, by the backend server, in response to the use of the website to liquidate the to-be-liquidated item;

comparing, by the backend server, a portion of the description of the to-be-liquidated item to a pre-configured threshold;
automatically sending a request from the backend server to another computer that is associated with a liquidator;
   wherein the liquidator is either a retail network or an auction house;
   wherein the request is automatically sent via the network in response to receiving, via the website, the description of the to-be-liquidated item; and
   wherein the request is sent to either the retail network or the auction house based on the comparison of the portion of the description to the pre-configured threshold;
   wherein, when the portion of the description is greater than the pre-configured threshold, then the request is sent to the auction house and the method further comprises:
     querying, using the backend server, one or more databases to determine a minimum acceptable bid; and
     transmitting, using the backend server, the minimum acceptable bid to the auction house;
   and
   wherein, when the portion of the description is equal to or less than the pre-configured threshold, then the request is sent to the retail network;
comparing, using the another computer that is associated with the liquidator, the description of the to-be-liquidated item with information in a database accessible by the another computer that is associated with the liquidator;
generating, using the another computer that is associated with the liquidator and based on the request, a liquidator bid;
   wherein the liquidator bid is based on the comparison of the description with information in the database and represents the monetary value the liquidator is willing to pay for the to-be-liquidated item;
generating, using the backend server, an impact statement,
   wherein the impact statement communicates a value in charitable goods and/or charitable services,
   wherein the value in charitable goods and/or charitable services is based on the liquidator bid, and
   wherein the backend server generates the impact statement based on the designation identifier that identifies the nonprofit entity;
displaying, via the website and on the display screen of the computer, the impact statement,
   wherein displaying the impact statement comprises displaying an icon on the display screen, the icon representing a portion of the impact statement;
receiving, via the website, an acceptance command accepting the impact statement;
aggregating, using the backend server, the item record with other item records that include the campaign identifier associated with the campaign of the nonprofit entity that is identified by the designation identifier; and
transmitting, via the website and to the computer, information including the transaction identifier, an identification of the to-be-liquidated item, and instructions regarding a transfer of the to-be-liquidated item to the liquidator.

2. A method, comprising:
displaying, via a website and on a display screen of a computer, an introductory message associated with a nonprofit entity;

receiving, via the website, a description of a to-be-liquidated item,
  wherein the to-be-liquidated item is to be converted to funds, which are to be received by the nonprofit entity;
generating, using a backend server, an item record, the item record comprising a transaction identifier that identifies a transaction by which the to-be-liquidated item is to be converted to the funds, and a status identifier that identifies a status of the to-be-liquidated item;
  wherein the backend server is in communication with the computer via a network;
  wherein the computer utilizes one or more application programming interfaces (APIs) provided by the backend server to communicate with the backend server via the network;
  wherein generating the item record comprises:
    providing, using the backend server, a web interface in embedded code on the website, the embedded code including:
      a designation identifier associated with the nonprofit entity, wherein the designation identifier identifies the nonprofit entity that will receive the funds from the conversion of the to-be-liquidated item; and
      a campaign identifier associated with a campaign of the nonprofit entity;
    automatically inserting, using the embedded code and on the backend server, the designation identifier and the campaign identifier in the item record,
      wherein the designation identifier and the campaign identifier are automatically inserted into the item record, by the backend server, in response to the use of the website to liquidate the to-be-liquidated item;
automatically sending a request from the backend server to another computer;
  wherein the request is automatically sent via the network, and
  wherein the request is automatically sent in response to receiving, via the website, the description of the to-be-liquidated item;
comparing, using the another computer, the description of the to-be-liquidated item with information in a database accessible by the another computer;
generating, using the another computer, a bid,
  wherein the bid is based on the comparison and represents a monetary value of the to-be-liquidated item; and
  wherein the another computer compares the description of the to-be-liquidated item with information in the database and generates the bid;
generating, using the backend server, an impact statement,
  wherein the impact statement communicates a value in charitable goods and/or charitable services,
  wherein the value in charitable goods and/or charitable services is based on the monetary value of the to-be-liquidated item, and
  wherein the backend server generates the impact statement based on the designation identifier that identifies the nonprofit entity;
displaying, via the website and on the display screen of the computer, the impact statement,
  wherein displaying the impact statement comprises displaying an icon on the display screen, the icon representing a portion of the impact statement;
receiving, via the website, an acceptance command accepting the impact statement;
aggregating, using the backend server, the item record with other item records that include the campaign identifier associated with the campaign of the nonprofit entity that is identified by the designation identifier; and
transmitting, via the website and to the computer, information including the transaction identifier, an identification of the to-be-liquidated item, and instructions regarding a transfer of the to-be-liquidated item to a liquidator;
receiving, on the backend server, a notification that the to-be-liquidated item has been transferred to the liquidator;
updating, using the backend server, the status identifier to reflect that the to-be-liquidated item has been transferred to the liquidator,
  wherein the backend server updates the status identifier in response to receiving the notification that the to-be-liquidated item has been transferred to the liquidator;
automatically generating, using the backend server, a communication notifying that the to-be-liquidated item has been transferred to the liquidator,
  wherein the communication notifying the donor that the to-be-liquidated item has been transferred to the liquidator is automatically generated by the backend server in response to the update to the status identifier;
and
providing, via the network and on the display screen of the computer, the communication notifying the donor that the to-be-liquidated item has been transferred to the liquidator.

3. The method of claim 2, wherein the instructions regarding the transfer of the to-be-liquidated item to the liquidator comprise shipping information including the destination to which the to-be-liquidated item is to be shipped, the shipping information further comprising the transaction identifier;
  wherein the shipping information is adapted to be printed to thereby produce a shipping label to be used to ship the to-be-liquidated item to the liquidator.

4. The method of claim 3, further comprising:
printing the shipping label; and
shipping, using the shipping label, the to-be-liquidated item to the liquidator.

5. The method of claim 2, wherein the web interface provided by the backend server acts as a representative of the nonprofit entity.

6. The method of claim 2, wherein the web interface provided by the backend server gives the appearance to a user of the website that the website represents a group of charities.

* * * * *